US00RE47594E

(19) United States
(12) Reissued Patent
Downing et al.

(10) Patent Number: US RE47,594 E
(45) **Date of Reissued Patent: *Sep. 3, 2019**

(54) VISUAL DATA IMPORTER

(71) Applicant: Palantir Technologies, Inc., Palo Alto, CA (US)

(72) Inventors: Stephen Downing, Palo Alto, CA (US); Kevin Richards, Menlo Park, CA (US); Asher Sinensky, San Francisco, CA (US)

(73) Assignee: Palantir Technologies Inc., Palo Alto, CA (US)

( * ) Notice: This patent is subject to a terminal disclaimer.

(21) Appl. No.: 14/883,280

(22) Filed: Oct. 14, 2015

Related U.S. Patent Documents

Reissue of:

(64) Patent No.: 8,560,494
Issued: Oct. 15, 2013
Appl. No.: 13/250,629
Filed: Sep. 30, 2011

(51) Int. Cl.
*G06F 7/00* (2006.01)
*G06F 17/00* (2019.01)
(Continued)

(52) U.S. Cl.
CPC ..... *G06F 16/212* (2019.01); *G06F 16/211* (2019.01); *G06F 16/258* (2019.01)

(58) Field of Classification Search
CPC .. G06Q 50/24; G06Q 50/22; G06F 17/30569; G06F 17/30292; G06F 17/30294; G06F 16/211; G06F 16/213; G06F 16/214
See application file for complete search history.

(56) References Cited

U.S. PATENT DOCUMENTS 5,418,950 A 5/1995 Li et al.
5,428,737 A 6/1995 Li et al.
(Continued)

FOREIGN PATENT DOCUMENTS

DE 102014103482 9/2014
EP 1647908 4/2006
(Continued)

OTHER PUBLICATIONS

Wollrath et al., "A Distributed Object Model for the Java System," Proceedings of the 2nd Conference on USENEX, Conference on Object-Oriented Technologies (COOTS), Jun. 17, 1996, pp. 219-231.
"A Quick Guide to UniProtKB Swiss-Prot & TrEMBL," Sep. 2011, pp. 2.
"A Tour of Pinboard," <http://pinboard.in/tour> as printed May 15, 2014 in 6 pages.
Alur et al., "Chapter 2: IBM InfoSphere DataStage Stages," IBM InfoSphere DataStage Data Flow and Job Design, Jul. 1, 2008, pp. 35-137.
(Continued)

*Primary Examiner* — Luke S Wassum
(74) *Attorney, Agent, or Firm* — Hickman Palermo Becker Bingham LLP

(57) ABSTRACT

Techniques for visual data import into an object model are described. A graphical user interface concurrently displays a first icon that represents a first object type and a second icon that represents a second object type. Input defining object-to-data mappings between properties of the object types and structured data of one or more data sources is received. Further input defining a relationship type for relationships between the first object type and the second object type is also received. In response to the second input, a graphical representation of the relationship type is displayed, visually linking the first icon to the second icon. Based at least on the object-to-data mappings, the definition of the relationship type, and the structured data, an object model is created, comprising first objects of the first object type, second objects of the second object type, and relationships between the first objects and the second objects.

26 Claims, 4 Drawing Sheets

(51) Int. Cl.

| | |
|---|---|
| ***G06F 17/30*** | (2006.01) |
| ***G06F 16/21*** | (2019.01) |
| ***G06F 16/25*** | (2019.01) |

(56) References Cited

U.S. PATENT DOCUMENTS 5,428,776 A 6/1995 Rothfield
5,542,089 A 7/1996 Lindsay et al.
5,608,899 A 3/1997 Li et al.
5,613,105 A 3/1997 Xbikowski et al.
5,701,456 A 12/1997 Jacopi et al.
5,724,575 A 3/1998 Hoover et al.
5,794,228 A 8/1998 French et al.
5,794,229 A 8/1998 French et al.
5,857,329 A 1/1999 Bingham
5,911,138 A 6/1999 Li et al.
5,918,225 A 6/1999 White et al.
5,991,758 A * 11/1999 Ellard ..... G06F 17/30321 709/206
6,208,985 B1 3/2001 Krehel
6,236,994 B1 5/2001 Swartz et al.
6,289,334 B1 9/2001 Reiner et al.
6,311,181 B1 10/2001 Lee et al.
6,321,274 B1 11/2001 Shakib et al.
6,745,382 B1 6/2004 Zothner
6,785,689 B1 * 8/2004 Daniel ..... G06F 17/30292 707/754
6,851,108 B1 2/2005 Syme et al.
6,857,120 B1 2/2005 Arnold et al.
6,877,137 B1 4/2005 Rivette et al.
6,976,024 B1 12/2005 Chavez et al.
7,085,890 B2 8/2006 Kashyap
7,155,728 B1 12/2006 Prabhu et al.
7,216,133 B2 5/2007 Wu et al.
7,406,592 B1 7/2008 Polyudov
7,519,589 B2 4/2009 Charnock et al.
7,526,486 B2 * 4/2009 Cushman, II ..... G06F 17/30303 709/203
7,546,353 B2 6/2009 Hesselink et al.
7,610,290 B2 10/2009 Kruy et al.
7,620,647 B2 * 11/2009 Stephens ..... G06F 17/30589 707/999.002
7,627,489 B2 12/2009 Schaeffer et al.
7,783,679 B2 8/2010 Bley
7,853,573 B2 12/2010 Warner et al.
7,877,421 B2 1/2011 Berger et al.
7,908,521 B2 3/2011 Sridharan et al.
7,962,495 B2 6/2011 Jain et al. ..... G06F 17/2705 706/2
7,979,424 B2 7/2011 Dettinger et al.
8,051,104 B2 * 11/2011 Weissman ..... G06F 17/30616 707/796
8,073,857 B2 * 12/2011 Sreekanth ..... 707/756
8,103,962 B2 * 1/2012 Embley et al. ..... G06F 17/243 715/763
8,356,009 B2 * 1/2013 Ellard ..... G06F 17/3056 707/620
8,359,339 B2 * 1/2013 Adams ..... G06F 17/30315 707/805
8,417,715 B1 4/2013 Bruckhaus et al.
8,429,194 B2 4/2013 Aymeloglu et al.
8,433,702 B1 4/2013 Carrino et al.
8,499,287 B2 7/2013 Shafi et al.
8,560,494 B1 10/2013 Downing
8,639,552 B1 1/2014 Chen et al.
8,713,434 B2 * 4/2014 Ford ..... G06F 17/30604 707/748
8,898,104 B2 * 11/2014 Mandelstein ..... G06F 16/84 707/602
8,909,597 B2 12/2014 Aymeloglu et al.
8,924,429 B1 12/2014 Fisher et al.
8,935,201 B1 1/2015 Fisher et al.
9,031,981 B1 5/2015 Potter et al.
9,105,000 B1 8/2015 White et al.
9,330,120 B2 * 5/2016 Downing ..... G06F 17/30294
9,613,067 B2 * 4/2017 Chang ..... G06F 17/30292
2002/0184111 A1 12/2002 Swanson
2003/0004770 A1 1/2003 Miller et al.
2003/0023620 A1 1/2003 Trotta
2003/0105833 A1 6/2003 Daniels
2004/0088177 A1 5/2004 Travis et al.
2004/0098731 A1 5/2004 Demsey et al.
2004/0103088 A1 5/2004 Cragun et al.
2004/0126840 A1 7/2004 Cheng et al.
2004/0139212 A1 7/2004 Mukherjee et al.
2004/0193608 A1 9/2004 Gollapudi et al.
2004/0216030 A1 * 10/2004 Hellman ..... G06F 17/30557 715/239
2004/0236737 A1 * 11/2004 Weissman ..... G06F 17/30616
2005/0004911 A1 1/2005 Goldberg et al.
2005/0015623 A1 * 1/2005 Williams ..... H04L 41/0853 726/4
2005/0021397 A1 1/2005 Cui et al.
2005/0120080 A1 6/2005 Weinreb et al.
2005/0183005 A1 8/2005 Denoue et al.
2005/0226473 A1 10/2005 Ramesh
2005/0278286 A1 12/2005 Djugash et al.
2005/0289134 A1 * 12/2005 Noguchi ..... G06F 17/30734
2006/0004740 A1 1/2006 Dettinger et al.
2006/0053098 A1 * 3/2006 Gardner ..... G06F 17/30734 707/999.003
2006/0053099 A1 * 3/2006 Gardner ..... G06F 17/30707
2006/0053135 A1 * 3/2006 Beaumont ..... G06F 19/12
2006/0053151 A1 * 3/2006 Gardner ..... G06F 17/279
2006/0053170 A1 * 3/2006 Hill ..... G06F 17/30707
2006/0053171 A1 * 3/2006 Eldridge ..... G06F 17/30713
2006/0053172 A1 * 3/2006 Gardner ..... G06N 5/02
2006/0053173 A1 * 3/2006 Gardner ..... G06F 17/30707
2006/0053174 A1 * 3/2006 Gardner ..... G06F 17/30707
2006/0053175 A1 * 3/2006 Gardner ..... G06F 17/30734
2006/0053382 A1 * 3/2006 Gardner ..... G06F 3/0482 715/764
2006/0070046 A1 3/2006 Balakrishnan et al.
2006/0074832 A1 * 4/2006 Gardner ..... G06N 5/02 706/45
2006/0074833 A1 * 4/2006 Gardner ..... G06N 5/02 706/45
2006/0074836 A1 * 4/2006 Gardner ..... G06N 5/02 706/60
2006/0074967 A1 4/2006 Shaburov
2006/0080616 A1 4/2006 Vogel et al.
2006/0116991 A1 6/2006 Calderwood
2006/0142949 A1 6/2006 Helt
2006/0209085 A1 9/2006 Wong et al.
2006/0271884 A1 11/2006 Hurst
2006/0288046 A1 12/2006 Gupta et al.
2007/0005582 A1 1/2007 Navratil et al.
2007/0011175 A1 * 1/2007 Langseth ..... G06F 17/30563 707/999.1
2007/0027851 A1 2/2007 Kruy et al.
2007/0094248 A1 4/2007 McVeigh et al.
2007/0113164 A1 5/2007 Hansen et al.
2007/0143327 A1 * 6/2007 Rivas ..... G06F 17/30436 707/999.101
2007/0150805 A1 6/2007 Misovski
2007/0168336 A1 7/2007 Ransil et al.
2007/0178501 A1 * 8/2007 Rabinowitz ..... G06Q 50/22 435/6.16
2007/0192281 A1 8/2007 Cradick et al.
2007/0203923 A1 * 8/2007 Thomas ..... G06F 17/30917 707/999.1
2007/0260582 A1 11/2007 Liang
2008/0082574 A1 * 4/2008 Hosokawa ..... G06F 17/30569 707/999.103
2008/0126344 A1 5/2008 Hoffman et al.
2008/0126951 A1 5/2008 Sood et al.
2008/0155440 A1 6/2008 Trevor et al.
2008/0196016 A1 8/2008 Todd
2008/0201313 A1 8/2008 Dettinger et al.
2008/0215543 A1 9/2008 Huang et al.
2008/0267386 A1 10/2008 Cooper

(56) References Cited

U.S. PATENT DOCUMENTS

2008/0320012 A1* 12/2008 Loving ..... G06F 16/213 707/E17.045
2009/0006150 A1 1/2009 Prigge et al.
2009/0007056 A1 1/2009 Prigge et al.
2009/0024590 A1* 1/2009 Sturge ..... G06F 17/30893 707/999.003
2009/0043762 A1 2/2009 Shiverick et al.
2009/0055487 A1 2/2009 Moraes et al.
2009/0083275 A1 3/2009 Jacob et al.
2009/0094184 A1* 4/2009 Ross ..... G06F 17/30734 706/60
2009/0094217 A1 4/2009 Dettinger et al.
2009/0144747 A1 6/2009 Baker
2009/0161147 A1 6/2009 Klave
2009/0172674 A1 7/2009 Bobak et al.
2009/0187556 A1 7/2009 Ross et al.
2009/0193012 A1 7/2009 Williams
2009/0228507 A1* 9/2009 Jain ..... G06F 17/2705 707/999.102
2009/0248721 A1 10/2009 Burton et al.
2009/0282068 A1* 11/2009 Shockro et al. ..... 707/101
2009/0299830 A1 12/2009 West et al.
2010/0011282 A1 1/2010 Dollard et al.
2010/0031240 A1* 2/2010 Drumm ..... G06F 8/10 717/143
2010/0073315 A1 3/2010 Lee et al.
2010/0082671 A1 4/2010 Li et al.
2010/0121885 A1* 5/2010 Hosomi ..... G06F 17/30734 707/794
2010/0145902 A1* 6/2010 Boyan et al. ..... 706/54
2010/0161646 A1 6/2010 Ceballos et al.
2010/0169376 A1 7/2010 Chu
2010/0169405 A1 7/2010 Zhang
2010/0199167 A1 8/2010 Uematsu et al.
2010/0313119 A1 12/2010 Baldwin
2011/0035396 A1 2/2011 Merz et al.
2011/0040805 A1* 2/2011 Carter ..... G06F 17/30867 707/808
2011/0041084 A1* 2/2011 Karam ..... 715/753
2011/0066497 A1 3/2011 Gopinath et al.
2011/0074811 A1* 3/2011 Hanson et al. ..... 345/629
2011/0093490 A1 4/2011 Schindlauer et al.
2011/0131547 A1 6/2011 Elaasar
2011/0145401 A1 6/2011 Westlake
2011/0208822 A1 8/2011 Rathod
2011/0252282 A1 10/2011 Meek et al.
2011/0258216 A1 10/2011 Supakkul et al.
2011/0270871 A1 11/2011 He et al.
2011/0321008 A1 12/2011 Jhoney et al.
2012/0078595 A1* 3/2012 Balandin et al. ..... 703/6
2012/0102022 A1* 4/2012 Miranker et al. ..... 707/713
2012/0102032 A1* 4/2012 Byrne ..... G06F 17/30294 707/737
2012/0117023 A1* 5/2012 Trog ..... G06N 5/022 707/609
2012/0159449 A1 6/2012 Arnold et al.
2012/0173381 A1* 7/2012 Smith ..... 705/26.5
2012/0174057 A1 7/2012 Narendra et al.
2012/0188252 A1* 7/2012 Law ..... 345/440
2012/0284719 A1 11/2012 Phan et al.
2013/0013580 A1* 1/2013 Geller ..... G06F 17/30672 707/706
2013/0024268 A1 1/2013 Manickavelu
2013/0054551 A1 2/2013 Lange
2013/0086482 A1 4/2013 Parsons
2013/0096968 A1 4/2013 Van Pelt et al.
2013/0198624 A1 8/2013 Aymeloglu et al.
2013/0225212 A1 8/2013 Khan
2013/0226944 A1 8/2013 Baid et al.
2013/0232220 A1 9/2013 Sampson
2014/0012886 A1 1/2014 Downing et al.
2014/0074888 A1 3/2014 Potter et al.
2014/0108074 A1 4/2014 Miller et al.
2014/0115589 A1 4/2014 Marinelli, III et al.
2014/0115610 A1 4/2014 Marinelli, III et al.
2014/0214579 A1 7/2014 Shen et al.
2014/0244388 A1 8/2014 Manouchehri et al.
2015/0269030 A1 9/2015 Fisher et al.
2017/0124158 A1* 5/2017 Mirhaji ..... G06F 17/30539

FOREIGN PATENT DOCUMENTS

EP 2634745 9/2013
EP 2743839 6/2014
EP 2778986 9/2014
EP 2921975 9/2015
GB 2366498 3/2002
GB 2508503 1/2015
GB 2508293 4/2015
HK 1194178 9/2015
NZ 622485 3/2015
NZ 616299 7/2015
WO WO 2000/034895 6/2000
WO WO 2010/030917 3/2010

OTHER PUBLICATIONS

Bae et al., "Partitioning Algorithms for the Computation of Average Iceberg Queries," DaWaK 2000, LNCS 1874, pp. 276-286.
Ballesteros et al., "Batching: A Design Pattern for Efficient and Flexible Client/Server Interaction," Transactions on Pattern Languages of Programming, Springer Berlin Heildeberg, 2009, pp. 48-66.
Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
"Frequently Asked Questions about Office Binder 97," http://web.archive.org/web/20100210112922/http://support.microsoft.com/kb/843147 printed Dec. 18, 2006 in 5 pages.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infastructure for Shared Web Annotations", Computer Networks, Elsevier Science Publishers B.V., vol. 39, No. 5, dated Aug. 5, 2002, pp. 589-608.

(56) References Cited

OTHER PUBLICATIONS

Karp et al., "A Simple Algorithm for Finding Frequent Elements in Streams and Bags," ACM Transactions on Database Systems, vol. 28, No. 1, Mar. 2003, pp. 51-55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "Nitelight: A Graphical Tool for Semantic Query Construction," 2008, pp. 10.
Sigrist, et al., "Prosite, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
"The FASTA Program Package," fasta-36.3.4, Mar. 25, 2011, pp. 29.
Wikipedia, "Machine Code" p. 1-5, printed Aug. 11, 2014.
Notice of Acceptance for New Zealand Patent Application No. 622485 dated Nov. 24, 2014.
Notice of Acceptance for New Zealand Patent Application No. 616212 dated Jan. 23, 2015.
Notice of Acceptance for New Zealand Patent Application No. 616299 dated Apr. 7, 2015.
Official Communication for New Zealand Patent Application No. 622414 dated Mar. 24, 2014.
Official Communication for New Zealand Patent Application No. 622484 dated Apr. 2, 2014.
Official Communication for European Patent Application No. 14159175.0 dated Jul. 17, 2014.
Official Communication for European Patent Application No. 14159629.6 dated Jul. 31, 2014.
Official Communication for European Patent Application No. 14159629.6 dated Sep. 22, 2014.
Official Communication for New Zealand Patent Application No. 622485 dated Nov. 21, 2014.
Official Communication for Great Britain Patent Application No. 1404574.4 dated Dec. 18, 2014.
Official Communication for Australian Patent Application No. 2013237710 dated Jan. 16, 2015.
Official Communication for New Zealand Patent Application No. 616299 dated Jan. 26, 2015.
Official Communication for Australian Patent Application No. 2013237658 dated Feb. 2, 2015.
Official Communication for Australian Patent Application No. 2014201580 dated Feb. 27, 2015.
Official Communication for German Patent Application No. 10 2013 221 057.4 dated Mar. 23, 2015.
Official Communication for German Patent Application No. 10 2013 221 052.3 dated Mar. 24, 2015.
Official Communication for Canadian Patent Application No. 2829266 dated Apr. 28, 2015.
Official Communication for Canadian Patent Application No. 2828264 dated Apr. 28, 2015.
Official Communication for Canadian Patent Application No. 2807899 dated Jul. 20, 2015.
Official Communication for Netherlands Patent Application No. 2011613 dated Aug. 13, 2015.

* cited by examiner

200

VISUAL DATA IMPORTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

Embodiments relate generally to techniques for facilitating the creation and/or manipulation of data in one or more data stores.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data is commonly stored in computer-based systems in fixed, rigidly structured data stores. For example, one common type of data store is a "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Often, the underlying structure of such data stores is poorly suited to data analysis. One approach for facilitating a more efficient analysis of data in such data stores is to reorganize that data according to an object model that defines object structures and relationships between the object structures. To create the object model, data elements in underlying data stores, such as table rows or cells, may be mapped to properties of the objects in the model. The semantics, or "meanings," of the various components of the object model are defined by an ontology that categorizes objects, relationships, and/or properties according to various defined types. For example, an ontology might categorize objects as being of one of the following types: person, entity, or event. The example ontology might further define different properties for each object type, such as names, dates, locations, documents, media, and so forth. The example ontology might further define relationships between objects, such as employee, participant, sibling, and so forth.

One approach for generating an ontology-based object model is described in U.S. Pat. No. 7,962,495 B2, issued Jun. 14, 2011, the entire contents of which are hereby incorporated by reference for all purposes. The '495 patent describes a dynamic ontology, in which both the object model and the semantics of the ontology may change and evolve over time as needed for analysis.

DETAILED DESCRIPTION

Figure 1:
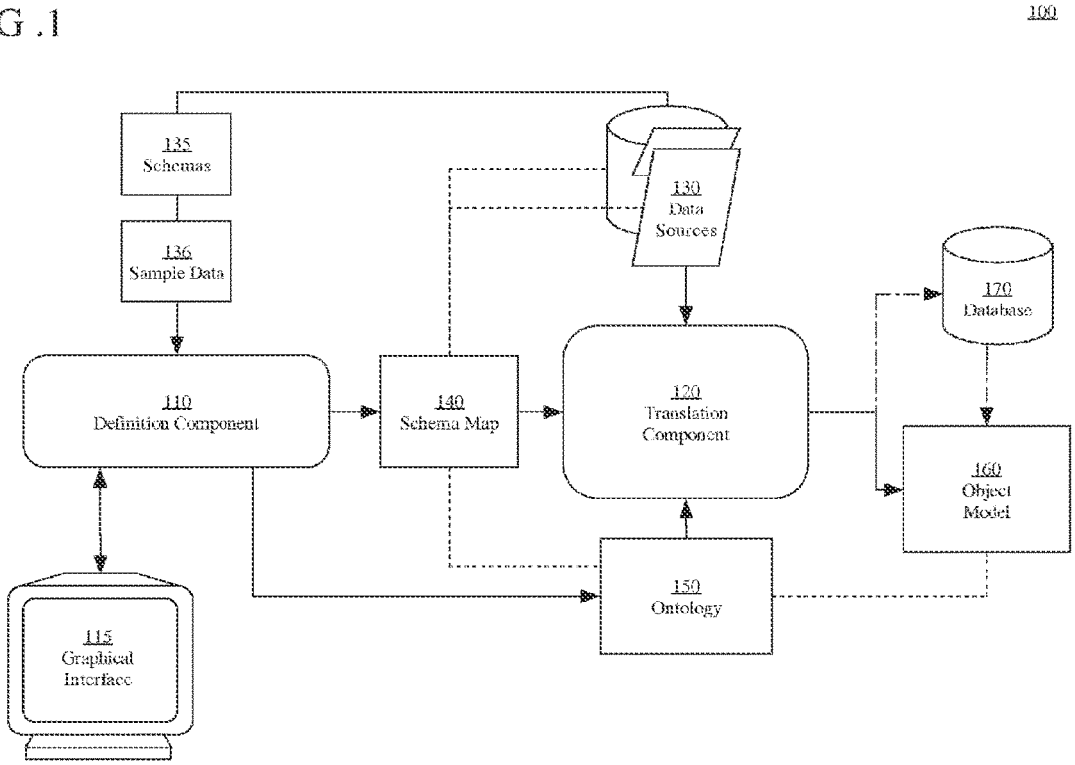
FIG. 1 is a block diagram of a system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
  3.1. Creating Objects and Relationships
  3.2. Updating the Dynamic Ontology
4.0. Example Interface
  4.1. Identifying Data Sources
  4.2. Visual Workspace
  4.3. Manipulating Objects and Relationships
  4.4. Object Previews
5.0. Automatic Mappings
6.0. Implementation Mechanism—Hardware Overview
7.0. Extensions and Alternatives

1.0. GENERAL OVERVIEW

Approaches, techniques, and mechanisms are disclosed for visual data import into an object model. According to one embodiment, a computing device concurrently displays, in a GUI of a computer display unit, a first object icon that graphically represents a first object type and a second object icon that graphically represents a second object type. The computing device receives, via the GUI, first input defining at least a portion of one or both of a first object-to-data mapping between first properties of the first object type and structured data of one or more data sources, and a second object-to-data mapping between second properties of the second object type and the structured data of the one or more data sources. The computing device further receives, in the GUI, second input defining a relationship type for relationships between the first object type and the second object type. In response to the second input, the computing device displays a graphical representation of the relationship type that visually links the first object icon to the second object icon. Based at least on the first object-to-data mapping, the second-object-to-data mapping, the relationship type, and the structured data, the computing device creates a plurality of first objects of the first object type, a plurality of second objects of the second object type, and a plurality of relationships between the first objects and the second objects.

In an embodiment, creating the object model comprises creating the first objects and the second objects in a revisioning database having a dynamic ontology.

In an embodiment, the computing device further receives one or more updates to one or more of the first properties or the second properties in a dynamic ontology that includes the first object type and the second object type. The computing device then repeats the displaying, the receiving, and the creating using one or more of the updated first properties or updated second properties.

In an embodiment, the computing device concurrently displays the first object icon, the second object icon, and the graphical representation of the relationship type in a visual workplace. The plurality of first objects, the plurality of second objects, and the plurality of relationships are subsequently displayed as part of a graph of interconnected nodes that is arranged similarly to the visual workspace.

In an embodiment, the computing device identifies one or more schemas for the structured data of the one or more data sources. The computing device provides mapping controls for selecting, for each particular property of the first properties and the second properties, one or more elements of the one or more schemas to map to the particular property. The computing device receives the first input, in part, via the mapping controls.

In an embodiment, while concurrently displaying the first object icon and the second object icon the computing device displays object and relationship previews. For example, the computing device displays a representation of a sample object that would be created from a sample data set based on the first object type definition and the first object-to-data mapping. As another example, the computing device displays one or more representations of one or more sample relationships that would be created for the sample object based on the relationship type definition.

In an embodiment, the computing device performs an import operation or translation operation on the one or more data sources. The import operation or translation operation includes the above-described creation of the plurality of first objects, the plurality of second objects, and the plurality of relationships.

In an embodiment, at least one of the first input and the second input originates from an analysis and comparison component that "guesses" mappings, as opposed to originating from a user via the GUI.

In an embodiment, the computing device receives input identifying conditions to be met by the one or more data sources prior to creation of a relationship of the relationship type.

In other aspects, the invention encompasses a computer apparatus and a computer-readable medium configured to carry out the foregoing steps.

2.0. STRUCTURAL OVERVIEW

FIG. 1 is a block diagram of a system 100 in which the techniques described herein may be practiced, according to an embodiment. System 100 facilitates translation of one or more data sources, such as data sources 130, into an object model 160 whose semantics are defined by an ontology 150. The translation may be performed for a variety of reasons. For example, a database administrator may wish to import data from data sources 130 into a database 170 for persistently storing object model 160. As another example, a data presentation component (not depicted) may translate data from data sources 130 "on the fly" into object model 160. The object model 160 can then be utilized, in conjunction with ontology 150, for analysis through graphs and/or other data visualization techniques.

System 100 comprises a definition component 110 and a translation component 120, both implemented by one or more processors on one or more computing devices executing hardware and/or software-based logic for providing various functionality described herein. System 100 may comprise fewer or additional components that provide various functionalities described herein. These components are, for clarity, omitted from FIG. 1. The component(s) of system 100 responsible for providing various functionalities may further vary from embodiment to embodiment.

Definition component 110 generates and/or modifies ontology 150 and a schema map 140. Schema map 140 defines how various elements of schemas 135 for data sources 130 map to various elements of ontology 150. Definition component 110 receives, calculates, extracts, or otherwise identifies schemas 135 for data sources 130. Schemas 135 define the structure of data sources 130—for example, the names and other characteristics of tables, files, columns, fields, properties, and so forth. Definition component 110 furthermore optionally identifies sample data 136 from data sources 130. Definition component 110 may further identify object type, relationship, and property definitions from ontology 150, if any already exist. Definition component 110 may further identify pre-existing mappings from schema map 140, if such mappings exist.

Based on the identified information, definition component 110 generates a graphical interface 115. Graphical interface 115 may be presented to users of a computing device via any suitable output mechanism, and may further accept input from users of the computing device via any suitable input mechanism. Graphical interface 115 features a visual workspace that visually depicts representations of the elements of ontology 150 for which mappings are defined in schema map 140. Graphical interface 115 also includes controls for adding new elements to schema map 140 and/or ontology 150, including objects, properties of objects, and relationships, via the visual workspace. Once elements of ontology 150 are represented in the visual workspace, graphical interface 115 further provides controls in association with the representations that allow for modifying the elements of ontology 150 and identifying how the elements of ontology 150 correspond to elements of schemas 135. Optionally, the graphical interface 115 may further utilize the sample data 136 to provide the user with a preview of object model 160 as the user defines schema map 140. In response to the input via the various controls of graphical interface 115, definition component 110 generates and/or modifies ontology 150 and a schema map 140. An example graphical interface 115 is described in subsequent sections.

Translation component 120 may be invoked once schema map 140 and ontology 150 have been defined or redefined. Translation component 120 identifies schema map 140 and ontology 150. Translation component further reads data sources 130 and identifies schemas 135 for data sources 130. For each element of ontology 150 described in schema map 140, translation component 120 iterates through some or all of the data items of data sources 130, generating elements of object model 160 in the manner specified by schema map 140. Depending on the embodiment, translation component 120 may store a representation of each generated element of object model 160 in a database 170. In an embodiment, translation component 120 is further configured to synchronize changes in object model 160 back to data sources 130.

Data sources 130 may be one or more sources of data, including, without limitation, spreadsheet files, databases, email folders, document collections, media collections, contact directories, and so forth. Data sources 130 may include data structures stored persistently in non-volatile memory. Data sources 130 may also or instead include temporary data structures generated from underlying data sources via data extraction components, such as a result set returned from a database server executing an database query.

Schema map 140, ontology 150, and schemas 135 may be stored in any suitable structures, such as XML files, database tables, and so forth. Ontology 150 is maintained persistently.

Schema map 140 may or may not be maintained persistently, depending on whether the translation process is perpetual or a one-time event. Schemas 135 need not be maintained in persistent memory, but may be cached for optimization.

Object model 160 comprises collections of elements such as typed objects, properties, and relationships. The collections may be structured in any suitable manner. In an embodiment, a database 170 stores the elements of object model 160, or representations thereof. In an embodiment, the elements of object model 160 are stored within database 170 in a different underlying format, such as in a series of object, property, and relationship tables in a relational database.

3.0. FUNCTIONAL OVERVIEW

3.1. Creating Objects and Relationships

Figure 2:
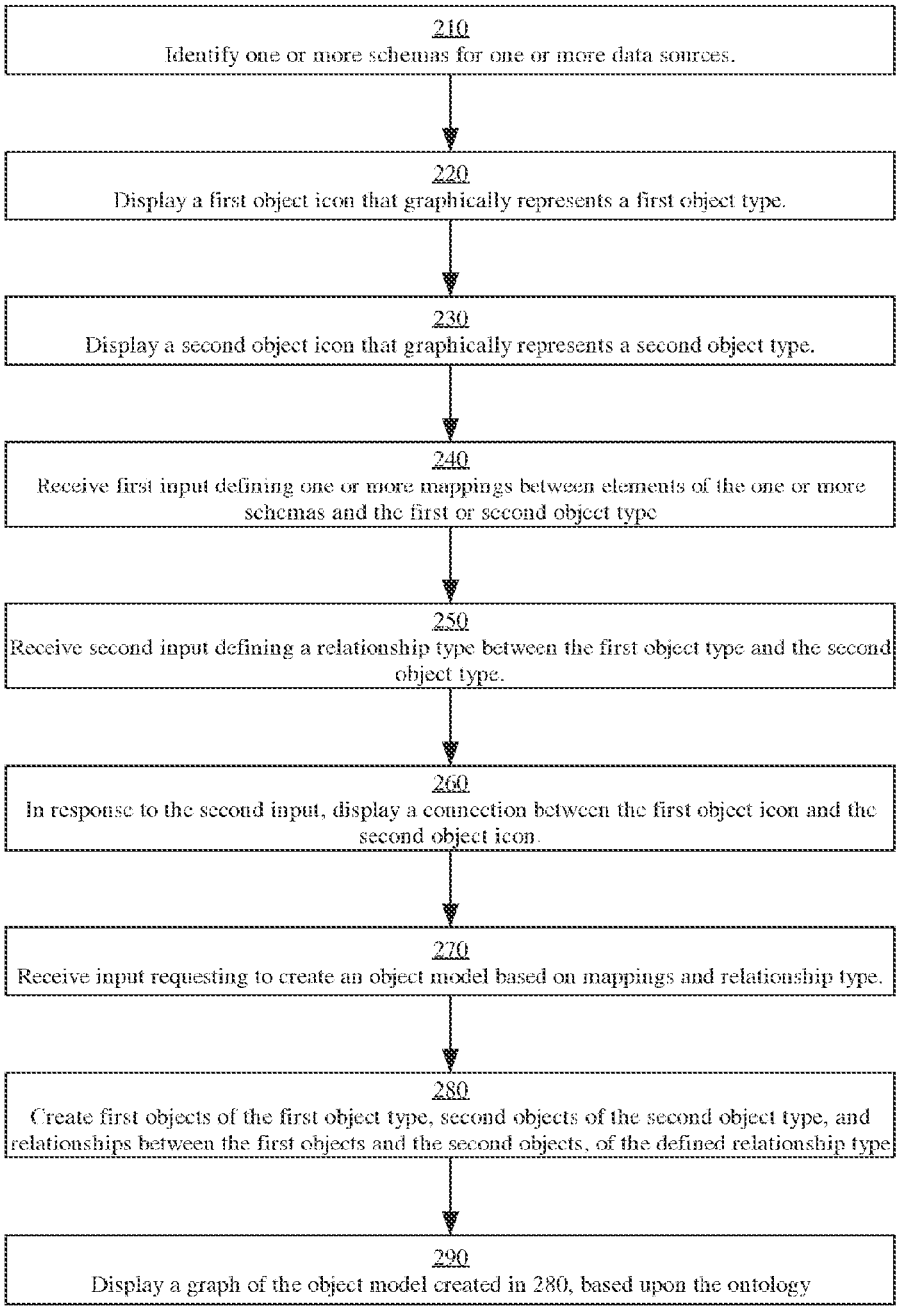
FIG. 2 illustrates a process flow for creating objects and relationships in an object model.

FIG. 2 illustrates a process flow 200 for creating objects and relationships in an object model, according to an embodiment. For simplicity, process flow 200 is described as being performed by a single computing device, such as a special purpose computing device executing instructions for a data import utility comprising definition component 110 and translation component 120. However, the elements of flow 200 may in fact be performed by two or more computing devices, such as a first computing device executing instructions for creating a visual schema map and a separate computing device executing instructions for a data import, viewing, or synchronization utility.

At block 210, a computing device identifies one or more schemas for one or more data sources, such as data sources 130. The one or more schemas define the structure(s) of the one or more data sources. A schema need not be complete or formal, rather a schema need only describe the organization of the data within a data source with enough specificity that the data of interest may be located and retrieved from the data source. For example, the schema for a relational database may define tables and columns, while the schema for a comma separated values file may simply define columns.

The computing device may identify the schema by retrieving the schema directly from the data source, if possible. Otherwise, the computing device may analyze the data source with or without user assistance to determine a schema. The computing device may begin the schema identification process in response to a number of events that identify possible data sources or sample data sets to import into an object model. For example, a user may identify the location of a data source to be imported, or the computing device may load a pre-existing schema map that describes a mapping for a specific data source.

At block 220, the computing device displays a first object icon that graphically represents a first object type in an ontology, such as ontology 150. The computing device displays the first object icon in a GUI, such as GUI 115. In an embodiment, the computing device displays the first object icon in a visual workspace of the GUI. The visual workspace is a specific portion of the GUI that graphically indicates to the user elements of the ontology that are described in a schema map, such as schema map 140.

The computing device may display an object icon in response to a number of events. For example, the user may have selected to add the first object type to a schema map by selecting the first object type from a list of pre-defined object types in the ontology. As another example, the user may have selected to add a new object type from the ontology. As another example, the computing device may have received input that identifies a pre-defined schema map to manipulate, in which the first object type is described. As another example, the computing device may have automatically determined to add the first object type without prompting from the user, based on characteristics of a schema and/or set of an example data.

In an embodiment, the computing device selects the first object icon based upon the object type, so that the first object icon indicates characteristics of the first object type to the user. For example, the first object icon may include an image of a person for a person object type, a cell phone for a phone call event object type, or a building for a location object type. In an embodiment, the first object icon may further portray, or be displayed with, additional information such as a label for the first object type, one or more properties, and/or controls for selecting or modifying the first object type. In an embodiment, the first object icon is selectable. The computing device may display additional controls for defining or manipulating the first object type and its mappings while the first object icon is selected.

At block 230, the computing device displays a second object icon that graphically represents a second object type in the ontology. The computing device displays the second object icon at least partially concurrently with displaying the first object icon in block 210. For example, after adding the first object icon to a visual workspace, the computing device may have received instructions to add the second object icon to the visual workspace in the vicinity of the first object icon. Depending on the second object type, the second object icon may be the same as or different from the first object icon. Display of the second object icon is otherwise similar to that of the first object icon.

At block 240, the computing device receives, via the GUI, first input defining one or more mappings between elements of the one or more schemas and the first or second object type. For example, a user may specify that a first column of a first table corresponds to a certain property of the first object type, while a second column of a particular spreadsheet is to be parsed for several properties of the second object type. In this manner, the user specifies how the structured data of the one or more data sources will be translated into the object model.

The first input may take any suitable form. For example, the properties of a selected object may be displayed in a first area of the GUI. The available elements of the one or more schemas may be displayed in a second area of the GUI. Mappings may be accomplished by dragging and dropping a schema element over a property, or vice versa. As another example, a pull-down menu may be displayed next to each property, from which a user may select a corresponding schema element. As another example, a schema element may be dragged to the first object type icon, and the computing device may in response automatically choose or create a property to map to the schema element.

At block 250, the computing device receives, via the GUI, second input defining a relationship type between the first object type and the second object type. The second input may take a variety of forms. For example, the user may hold a button down while dragging a pointer from object type to another. As another example, the user may select the second object type from a pull-down list of object types in a control for defining new relationships associated with the first object icon.

In an embodiment, the second input includes input that further defines the relationship type. For example, upon a user requesting to create a new relationship, the computing device may display a menu that lists available relationship types in the ontology, such as "Appears in" or "Child of." As another example, the computing device may present controls that allow the user to select one or more properties of the first object type and second object type that should match for a relationship of the relationship type to exist. As another example, the computing device may present controls that allow the user to select one or more schema elements whose values indicate the existence of a relationship of the relationship type.

At block 260, in response to the second input, the computing device displays a connection between the first object icon and the second object icon to indicate that the relationship type has been defined. For example, the computing device may display a line connecting the first object icon to the second object icon. The graphical representation of the connection may vary depending on the relationship type. For example, the graphical representation may vary in line width, line type, color, label, and/or associated icon(s). In an embodiment, the connection is selectable by the user. In response to selection of the connection, the computing device may present controls such as described above with respect to the first object icon for further defining the relationship.

At block 270, the computing device receives input requesting to create an object model based at least on the first object-to-data mapping, the second-object-to-data mapping, the relationship type, and one or more specified structured data sources. The input may take a variety of forms. For example, the input may comprise a user selection of a "Generate Now" button from within the GUI.

As another example, the input may comprise multiple input events. For example, the user may instruct the computing device via the GUI to save mappings, object type definitions, and relationships to a schema map file and, if necessary, to an ontology file. The user may then invoke another interface of the computing device, such as a command line interface, by which the user may provide instructions to the computing device to use the schema map to import data from one or more specified data sources into an object model. The specified one or more data sources may be the same as those from which the one or more schemas were identified in block 210. Or, the specified one or more data sources may be different from the data sources of block 210, but have the same one or more schemas. Such may be the case, for example, if one or more data sources of block 210 were sample data sets of larger data repositories.

At block 280, in response to the input of block 270, the computing device creates a plurality of first objects of the first object type, a plurality of second objects of the second object type, and a plurality of relationships between the first objects and the second objects, of the defined relationship type. The first objects, second objects, and relationships are generated based at least on the first object-to-data mapping, the second-object-to-data mapping, the relationship, and one or more structured data sources. The properties of the first object and second objects, as well as the generated relationships, thus reflect the data of the structured data sources. Performance of block 280 may comprise, for instance, the computing device iterating through each data item of a data source. For each iterated data item, the computing device may create one or more objects and relationships based on applying the mappings to the iterated data item. The computing device may utilize any suitable mapping, translation, and/or conversion technique for the process.

In an embodiment, creating the first objects, second objects, and relationships comprises storing data representative of the first objects, second objects, and relationships in a revisioning database having a dynamic ontology. However, in other embodiments, the data may be stored in other formats and locations, including temporary structures in volatile memory.

At block 290, the computing device optionally displays a graph of the object model, based upon the ontology. The graph may be, for example, a network of interconnected nodes. The nodes may include first objects and second objects connected according to the generated relationships.

In an embodiment, the arrangement of the graph is similar to that of the visual workspace in which the first icon and the second icon were displayed. For example, first objects may be displayed with the first object icon, second objects may be displayed with the second object icons, and relationships may be indicated with connections similar to those displayed in block 260. The layout of the first objects and second objects may also mirror the layout of the first object icon and the second object icon. In other words, the GUI for defining the mappings used to create the object model is visually similar and structurally isomorphic to a manner in which the object model will be graphed. The computing device thereby provides an intuitive interface for describing how data source(s) will be represented in an object model, in which a user can see how a graph such as that of block 290 might look while the user is defining the schema map.

Flow 200 is an example process flow. Other embodiments may involve fewer or additional elements in potentially varying arrangements. For example, the computing device may display a number of other icons, each representative of other object types. The computing device may further receive input defining additional relationships between the first object type, the second object type, and/or other object types. Thus, the computing device may display any number of interconnected icons representing any number of object types and relationships. Mappings may be defined for these object types via various controls of the GUI. Objects and/or relationships may be generated based thereon, per block 280.

As another example, the object model generated as a result of block 280 may be used for many purposes other than displaying the graph of block 290. For example, the object model may be searched, aggregated, mined, or visualized using any suitable data analysis technique.

3.2. Updating the Schema Map

In an embodiment, the schema map generated via flow 200 is dynamic, in that the computing device allows the user to return to the GUI after having generated the object model in block 290. The embodiment presumes that the schema map and ontology have been stored in a suitable format, such as in an XML file or a database, from which they can be reconstructed. The computing device reads the stored schema map and ontology and recreates the GUI with the first object icon connected to the second object icon. The computing device further displays controls associated with the icons that allow the user to select the first object type, the second object type, and/or relationship type. Once selected, the user may update the first properties, the second properties, and or the relationship type. The user may make changes both to schemas (for example, the names and types of properties) and the schema map (for example, the mappings to the one or more schemas). The user may then instruct the computing device to update the object model based on the changes. Thus, the first objects, second objects, and relationships generated in block 280 may be updated with new properties and/or data. Moreover, the graph displayed in block 290 may be reorganized based upon changes to the ontology.

For example, after the object model has been deployed for a few weeks, a user may decide that the ontology is not optimal for analysis. The user may, for instance, wish to add a certain property to the first object type, model the relationship as a distinct object type linked to both the first object type and the second object type, or split the properties of the second object type amongst several interconnected but separate object types. The user may update the ontology and, if necessary, relaunch the GUI to modify the schema map for the updated ontology, as discussed above.

As another example, the user may decide to import into the object model additional data fields that have newly become available in a data source. The user may cause the computing device to re-identify the schema for the data source, thus resulting in a schema that includes the additional data fields. The user may then utilize the GUI, as discussed above, to update mappings or create new mappings for the new data fields.

4.0. EXAMPLE INTERFACE

Figure 3:
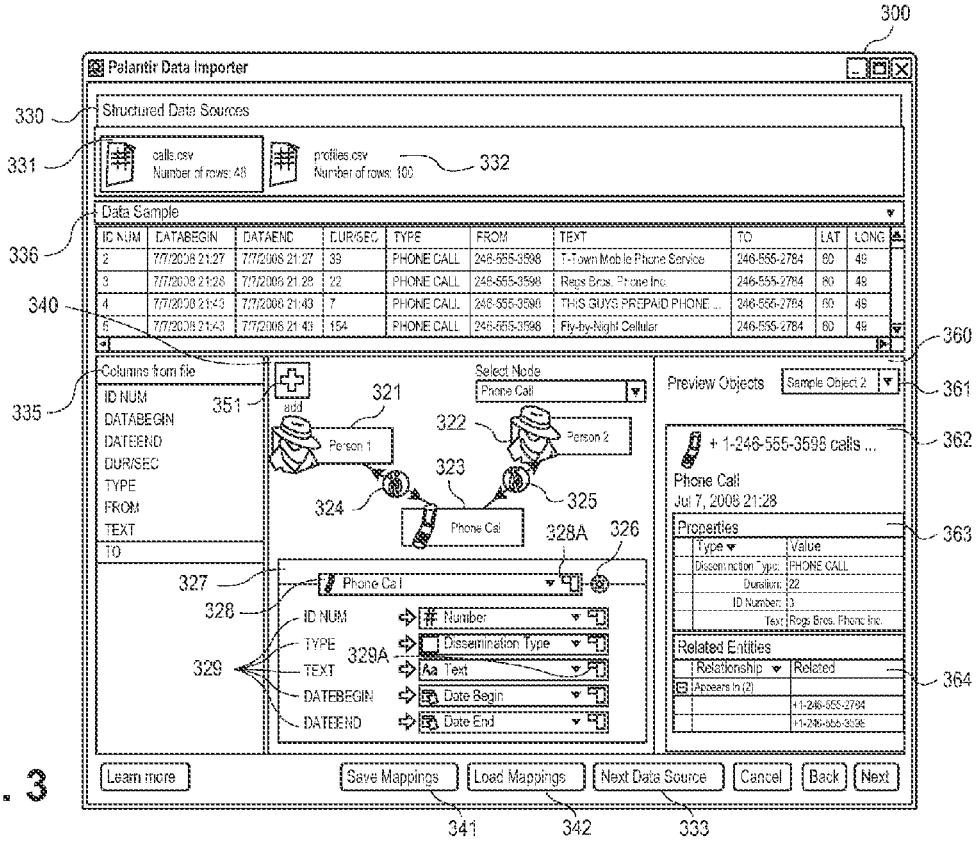
FIG. 3 illustrates a graphical user interface ("GUI") for practicing the techniques described herein.

FIG. 3 illustrates a GUI 300 for practicing the techniques described herein, according to an embodiment. GUI 300 is but one example of a GUI suitable for practicing the described techniques. Other interfaces may include fewer or different elements with potentially different representations in potentially different arrangements.

4.1. Identifying Data Sources

GUI 300 comprises a data source section 330 that identifies data sources 331 and 332. Data source section 330 indicates data sources whose schemas are available for mapping to elements of an ontology. The depictions of each data source 331 and 332 include information to assist the user in recognizing the data source, such as icons, data source names, and numbers of rows. As depicted in FIG. 3, data source 331 is currently selected. The selected data source may be changed by any suitable mechanisms, such as clicking on the desired data source or clicking on control 333 at the bottom of GUI 300.

Data sources 331 and 332 may have been identified by, for instance, a user dragging and dropping files into section 330 or otherwise inputting data source locations. The data sources may also have been identified automatically by an application that searches for data sources in specified locations in a file system or over a network. Although two data sources 331 and 332 are depicted, data source section 330 may identify fewer or additional data sources as well. Moreover, data sources 331 and 332 are not constrained in format to the depicted CSV files, but may adhere to a variety of other data formats, such as databases, query result sets, XML files, web directories, and so forth.

GUI 300 comprises additional elements, which may change depending on which of data sources 331, 332 is currently selected. These elements include a schema section 335 and a data sample section 336. Schema sections 335 depicts some or all of a schema that has been identified for the selected data source. For example, because selected data source 331 is a spreadsheet, schema section 335 lists columns from data source 331. As another example, for a database, schema section 335 may include a multi-level tree of database, table, and field names.

Schema section 335 need not necessarily depict all identified schema elements for a data source. For example, the computing device may be configured to automatically map columns having certain names to certain inherent or otherwise designated properties. Thus, the automatically mapped columns may be omitted from schema section 335.

Data sample section 336 displays a preview of some or all of the data in the currently selected data source, using whatever format may be appropriate. For example, for data in a table or spreadsheet format, data sample 336 may display a scrollable table of a certain number of columns and rows in the selected data source. As another example, data sample 336 may display a document if the data source is a structured document. In this manner, data sample section 336 provides a user with a better idea of the type of data stored for each schema element of the selected data source.

4.2. Visual Workspace

GUI 300 comprises a workspace 340 that indicates elements of an ontology for which mappings have been defined in a schema map. Workspace 340 includes object icons 321-323 and connections 324 and 325. Object icons 321-323 represent object types in an ontology. Connections 324 and 325 represent relationship types. As depicted, object icons 321 and 322 both represent a "Person" object type. Object icon 323 represents a "Phone Call" event object type. Connections 324 and 325 both represent an "Appears in" relationship type.

4.3. Manipulating Objects and Relationships

Icons 321-323 and connections 324-325 are selectable to facilitate manipulation of their respectively represented object types and relationship types. Once an icon 321-323 or connection 324-325 is selected, element manipulation component 327 appears in GUI 300. Element manipulation component 327 comprises object type selector 328, property mappers 329, and object type manipulator 326.

Object type selector 328 is a pull-down menu that allows the user to select between different object types that are already defined in the ontology. The computing device may access such information about the ontology from a global ontology file, or from a specialized ontology file identified elsewhere by the user. To the far right of the pull-down menu is a custom object type control 328a. Upon activation of the control, GUI 300 may launch an interface (not depicted) for defining a new object type for selection, or for renaming the currently selected object type. Object type manipulator 326 allows for further customization of the object type, such as the creation of new properties or the identification of schema elements whose values determine whether an object should be created for any given data item. Note that, had one of connections 324 or 325 been selected instead of object icon 323, object type selector 328 would have instead allowed selection of a defined relationship type, custom object type control 328a would have instead permitted creation of a custom relationship type, and object type manipulator 326 would have permitted further customization of the relationship type.

Element manipulation component 327 comprises property mappers 329 for some or all schema elements listed in schema section 335. Each property manipulator 329 includes the name of a schema element, as well as a pull-down menu from which a property may be selected to map to the schema element. The pull-down menu lists property elements that are defined for the currently selected object. Additionally, to the far right of the pull-down menu is a custom property control 329a. Upon activation of the control, GUI 300 may launch an interface (not depicted) for defining a new property for selection, or for renaming the currently selected property. Custom property control 329a may also feature advanced property mapping components that include capabilities such as restricting a mapping to only a portion of a schema element, defining a mapping to a specified combination of schema elements, or defining a mapping as a functions of one or more schema elements.

Workspace 340 includes a control 351 for adding additional object types to the schema map. In response to the user selecting the control, an icon for the added object type is added to the workspace. An added object type may be initially set to a default type. However, the object type may be manipulated using object type manipulator 328 as described above.

Control 341 allows for saving the schema map represented in the workspace 340 to, for instance, a file. Control 342 allows for loading the schema map from a file into workspace 340. A saved schema map may also be identified to a translation or importation component when generating an object model. In an embodiment, GUI 300 may also include controls for saving changes to an ontology. In an embodiment, changes to the ontology are saved automatically and/or with a schema map file.

4.4. Object Previews

GUI 300 includes an object preview section 360. Object preview section 360 allows a user to view data that would be assigned to sample objects, relationships, and properties, based on the schema map being defined in workspace 340. Object preview section 360 may be updated at regular intervals, in response to a trigger event, or in response to any change to workspace 340. As depicted, object preview section 360 displays a preview for only one object, but other embodiments may allow previews of multiple objects. Additionally, the manner in which the data in a sample object is previewed may vary from embodiment to embodiment.

Sample object selector 361 lists each sample object available for viewing. In an embodiment, sample object selector 361 allows a user to view objects created based on a small subset of the sample data depicted in sample data area 336, such as the first 10 rows. In an embodiment, sample object selector 361 allows a user to view objects created for each and every data item in a data source.

Object preview section 360 includes a property preview table 363. Table 363 includes labels for some or all properties of the sample object, along with an indication of at least a portion of their respective values. Object preview section 360 also includes a related entities table 363. Each relationship that would be created for the sample object is listed in table 363, along with an indication of the objects to which the sample object is related.

5.0. AUTOMATIC MAPPINGS

In an embodiment, input that identifies a mapping between an ontology element and a schema element may be received from, at least in part, an analysis and comparison component of the computing device. That is, when the user adds an object, relationship, or property to a visual schema map, the computing device automatically creates certain mappings without the user's input. For example, upon adding a predefined object type to the schema map, the analysis and comparison component may perform a lexical comparison between property labels and schema elements to guess which property labels should be mapped to which schema elements. For instance, if the schema includes an element named "First name," and the ontology includes a property named "FIRST NAME," the computing device may automatically map the schema element to the property. As another example, the computing device may maintain history of previous mappings for other schema maps, system preference data, and/or user-specified rules that allow the computing device to guess an appropriate mapping for a property. Any of a variety of algorithms are suitable for automatically identifying such mappings.

The input that defines relationship types may also originate from an analysis and comparison component as opposed to a user. For example, a relationship may be automatically created between certain objects have similar properties or properties that are mapped to the same or similar schema elements. In an embodiment, both object types and property types may also be added to a schema map automatically based on comparisons of the object types to the available schema elements, a history of previously created schema maps by the same or a different user, and/or specified user or system rules.

The user may accept an automatic mapping without further input, or the user may modify certain automatic mappings using other techniques as described herein.

6.0. IMPLEMENTATION MECHANISM

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
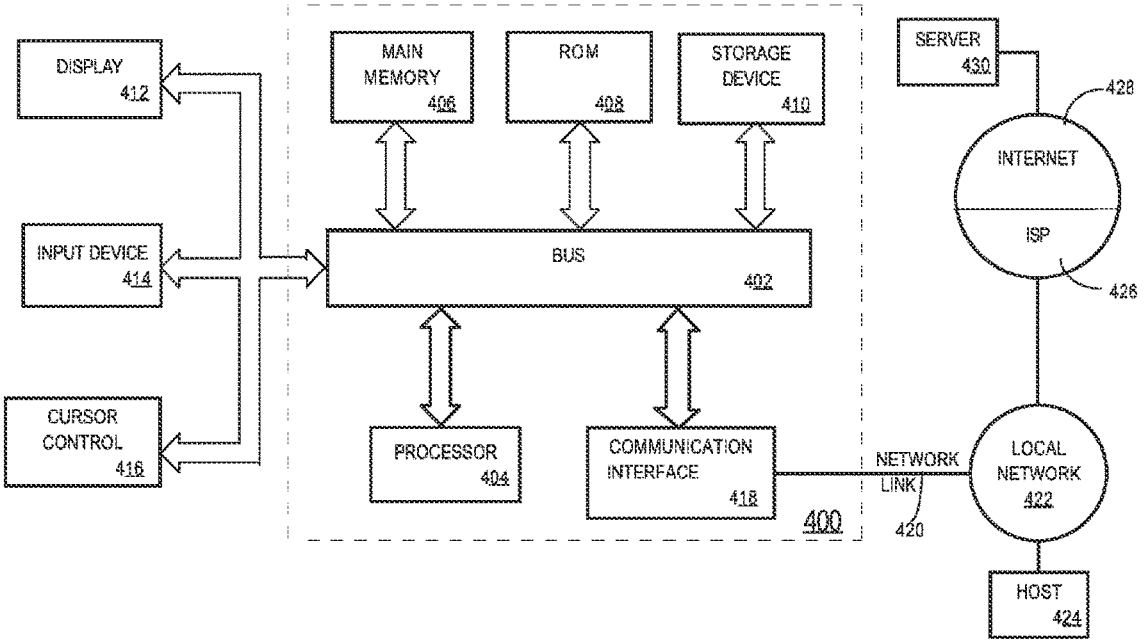
FIG. 4 is block diagram of a computer system upon which embodiments of the invention may be implemented.

For example, FIG. 4 is a block diagram that illustrates a computer system 400. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7.0. EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of [generating object structures by] importing structured data from one or more data sources *into an object model based on an ontology that categorizes objects, relationships, and properties according to various defined types*, comprising:

concurrently displaying, in a graphical user interface of a computer display unit, a first icon that graphically represents *a first object associated with* a first object type and a second icon that graphically represents *a second object associated with* a second object type, wherein the [first object type is a category of object structures that are comprised of first properties, wherein the second object type is a different category of object structures that are comprised of second properties at least partly different than the first properties] *second object type is different from the first object type*;

receiving *a* first input defining at least a portion of a first mapping between [the] first properties of the first object type and the structured data of the one or more data sources;

receiving *a* second input defining at least a portion of a second mapping between [the] second properties of the second object type and the structured data of the one or more data sources;

[wherein at least one of the first input or the second input originates from an analysis and comparison component that automatically identifies predicted mappings, and not from user input in the graphical user interface;]

receiving, in the graphical user interface, *a* third input defining a relationship [type, wherein the relationship type characterizes relationship structures that specify relationships] between [object structures of] the first object [type] and [object structures of] the second object [type], *wherein the relationship is associated with a relationship type*;

in response to the third input, displaying in the graphical user interface a graphical representation of the relationship [type] that visually links the first icon to the second icon;

based at least on the first mapping, the second mapping, the relationship type, and the structured data, *automatically* creating a plurality of first object structures of the first object type, a plurality of second object structures of the second object type, and a plurality of relationship structures between the first object structures and the second object structures *including automatically adding one or more of the first object type and the second object type based on comparisons of the object types to available schema elements, a history of previously created schema maps by the same or a different user, and/or specified user or system rules*;

*wherein the creating comprises creating the first object structures and the second object structures using the ontology and in which the relationship structures are of the relationship type;*

*storing the plurality of first object structures, the plurality of second object structures, and the plurality of relationship structures in a database that persists data in the object model;* wherein the method is performed by one or more computing devices.

[2. The method of claim 1 wherein the creating comprises creating the first object structures and the second object structures in a revisioning database having a dynamic ontology.]

3. The method of claim 1 further comprising receiving one or more updates to one or more of the first properties or the second properties in a dynamic ontology that includes the first object type and the second object type; and repeating the *concurrently* displaying, the receiving, and the creating using one or more of the updated first properties or updated second properties.

4. The method of claim 1, further comprising:

concurrently displaying the first icon, the second icon, and the graphical representation of the relationship type in a visual workplace;

displaying representations of the plurality of first object structures, the plurality of second object structures, and the plurality of relationship structures as part of a graph of interconnected nodes that is arranged similar to the visual workspace.

5. The method of claim 1, further comprising:

identifying one or more schemas for the structured data of the one or more data sources;

providing mapping controls for selecting, for each particular property of the first properties and the second properties, one or more elements of the one or more schemas to map to the particular property;

receiving the first input, at least in part, via the mapping controls.

6. The method of claim 1, further comprising, while concurrently displaying the first icon and the second icon:

displaying a representation of a sample object structure that would be created from a sample data set based on the first object type and the first mapping;

displaying one or more representations of one or more sample relationship structures that would be created for the sample object structure based on the relationship type.

7. The method of claim 1, further comprising performing an import operation or translation operation on the one or more data sources, the import operation or translation operation including the creating of the plurality of first object structures, the plurality of second object structures, and the plurality of relationship structures.

8. The method of claim 1, further comprising receiving input identifying conditions to be met by the one or more data sources prior to creation of a relationship structure of the relationship type.

9. The method of claim 1, wherein the first input originates from user input in the graphical user interface, and the second input originates from the [analysis and comparison component] *one or more computing devices*.

10. The method of claim 1, wherein the second input originates from the [analysis and comparison component] *one or more computing devices*, the method further comprising receiving, after the second input, via the graphical user interface, fourth input that modifies the second mapping.

11. The method of claim 1, further comprising, receiving initial input, different from the first input, that defines the relationship type, wherein the initial input originates from the [analysis and comparison component] *one or more computing devices* and automatically creates the relationship type, wherein the third input is a further input that modifies the relationship type.

12. One or more non-transitory computer-readable media storing instructions for [generating object structures by] importing structured data from one or more data sources *into an object model based on an ontology that categorizes objects, relationships, and properties according to various defined types*, wherein the instructions, when executed by one or more computing devices, cause performance of:

concurrently displaying, in a graphical user interface of a computer display unit, a first icon that graphically represents *a first object associated with* a first object type and a second icon that graphically represents *a second object associated with* a second object type, wherein the [first object type is a category of object structures that are comprised of first properties, wherein the second object type is a different category of object structures that are comprised of second properties at least partly different than the first properties] *second object type is different from the first object type*;

receiving[, in the graphical user interface,] *a* first input defining at least a portion of a first mapping between [the] first properties of the first object type and the structured data of the one or more data sources;

[receiving first input defining at least a portion of a first mapping between the first properties of the first object type and the structured data of the one or more data sources;]

receiving *a* second input defining at least a portion of a second mapping between [the] second properties of the second object type and the structured data of the one or more data sources;

*receiving, in the graphical user interface, a third input defining a relationship between the first object and the second object, wherein the relationship is associated with a relationship type;*

[wherein at least one of the first input or the second input originates from an analysis and comparison component that automatically identifies predicted mappings, and not from user input in the graphical user interface;]

in response to the third input, displaying [a] *in the graphical user interface a* graphical representation of the relationship [type] that visually links the first icon to the second icon;

based at least on the first mapping, the second mapping, the relationship type, and the structured data, *automatically* creating a plurality of first object structures of the first object type, a plurality of second object structures of the second object type, and a plurality of relationship structures between the first object structures and the second object structures *including automatically adding one or more of the first object type and the second object type based on comparisons of the object types to available schema elements, a history of previously created schema maps by the same or a different user, and/or specified user or system rules;*

*wherein the creating comprises creating the first object structures and the second object structures using the ontology and in which the relationship structures are of the relationship type;*

*storing the plurality of first object structures, the plurality of second object structures, and the plurality of relationship structures in a database that persists data in the object model.*

[13. The one or more non-transitory computer-readable media of claim 12, wherein the creating comprises creating the first object structures and the second object structures in a revisioning database having a dynamic ontology.]

14. The one or more non-transitory computer-readable media of claim 12, wherein the instructions, when executed by the one or more computing devices, further cause performance of:

receiving one or more updates to one or more of the first properties or the second properties in a dynamic ontology that includes the first object type and the second object type; and repeating the *concurrently* displaying, the receiving, and the creating using one or more of the updated first properties or updated second properties.

15. The one or more non-transitory computer-readable media of claim 12, wherein the instructions, when executed by the one or more computing devices, further cause performance of:

concurrently displaying the first icon, the second icon, and the graphical representation of the relationship type in a visual workplace;

displaying representations of the plurality of first object structures, the plurality of second object structures, and the plurality of relationship structures as part of a graph of interconnected nodes that is arranged similar to the visual workspace.

16. The one or more non-transitory computer-readable media of claim 12, wherein the instructions, when executed by the one or more computing devices, further cause performance of:

identifying one or more schemas for the structured data of the one or more data sources;

providing mapping controls for selecting, for each particular property of the first properties and the second properties, one or more elements of the one or more schemas to map to the particular property;

receiving the first input, at least in part, via the mapping controls.

17. The one or more non-transitory computer-readable media of claim 12, wherein the instructions, when executed by the one or more computing devices, further cause performance of, while concurrently displaying the first icon and the second icon:

displaying a representation of a sample object structure that would be created from a sample data set based on the first object type and the first mapping;

displaying one or more representations of one or more sample relationship structures that would be created for the sample object structure based on the relationship type.

18. The one or more non-transitory computer-readable media of claim 12, wherein the instructions, when executed by the one or more computing devices, further cause performance of: performing an import operation or translation operation on the one or more data sources, the import operation or translation operation including the creating of the plurality of first object structures, the plurality of second object structures, and the plurality of relationship structures.

19. The one or more non-transitory computer-readable media of claim 12, wherein the instructions, when executed by the one or more computing devices, further cause performance of: receiving input identifying conditions to be met by the one or more data sources prior to creation of a relationship structure of the relationship type.

20. The one or more non-transitory computer-readable media of claim 12, wherein the first input originates from user input in the graphical user interface, and the second input originates from the [analysis and comparison component] *one or more computing devices*.

21. The one or more non-transitory computer-readable media of claim 12, wherein the second input originates from the [analysis and comparison component,] one or more [non-transitory computer-readable media of claim 10] *computing devices*, wherein the instructions, when executed by the one or more computing devices, further cause receiving, after the second input, via the graphical user interface, fourth input that modifies the second mapping.

22. The one or more non-transitory computer-readable media of claim 12, wherein the instructions, when executed by the one or more computing devices, further cause, receiving initial input, different than the first input, that defines the relationship type, wherein the initial input originates from the [analysis and comparison component] *one or more computing devices* and automatically creates the relationship type, wherein the third input is a further input that modifies the relationship type.

23. A computer system comprising:

one or more processors;

[an analysis and comparison component, implemented in part by the one or more processors, that automatically identifies predicted mappings between object properties and structured data;

a definition component, implemented in part] *one or more non-transitory computer-readable media storing instructions for importing structured data from one or more data sources into an object model based on an ontology that categorizes objects, relationships, and properties according to various defined types, wherein the instructions, when executed* by the one or more processors, [configured to] cause performance of:

concurrently displaying, in a graphical user interface of a computer display unit, a first icon that graphically represents *a first object associated with* a first object type and a second icon that graphically represents *a second object associated with* a second object [type, wherein the first object type is a category of object structures that are comprised of first properties, wherein the second object type is a different category of object structures that are comprised of second properties at least partly different than the first properties];

receiving *a* first input defining at least a portion of a first mapping between [the] first properties of the first object type and the structured data of the one or more data sources;

receiving *a* second input defining at least a portion of a second mapping between [the] second properties of the second object type and the structured data of the one or more data sources;

[wherein at least one of the first input or the second input originates from the analysis and comparison component, and not from user input in the graphical user interface;]

receiving, in the graphical user interface, third input defining a relationship [type, wherein the relationship type categorizes relationship structures that specify relationships] between [object structures of] the first object [type] and [object structures of] the second object [type], *wherein the relationship is associated with a relationship* type;

in response to the third input, displaying a graphical representation of the relationship [type] that visually links the first icon to the second icon;

[a translation component, implemented in part by the one or more processors, configured to cause performance of:]

based at least on the first mapping, the second mapping, the relationship type, and the structured data, *automatically* creating a plurality of first object structures of the first object type, a plurality of second object structures of the second object type, and a plurality of relationship structures between the first object structures and the second object structures *including automatically adding one or more of the first object type and the second object type based on comparisons of the object types to available schema elements, a history of previously created schema maps by the same or a different user, and/or specified user or system rules;*

*storing the plurality of first object structures, the plurality of second object structures, and the plurality of relationship structures in a database that persists data in the object model.*

24. The computer system of claim 23, further comprising a revisioning database having a dynamic ontology, the revisioning database storing data describing the plurality of first object structures, the plurality of second object structures, and the plurality of relationship structures.

25. The computer system of claim 24, wherein the one or more processors are further configured to cause performance of: receiving one or more updates to one or more of the first properties or the second properties in a dynamic ontology that includes the first object type and the second object type; and repeating the *concurrently* displaying, the receiving, and the creating using one or more of the updated first properties or updated second properties.

*26. The method of claim 1, wherein at least one of the first input and the second input originates from the one or more computing devices.*

*27. The one or more non-transitory computer-readable media of claim 12, wherein at least one of the first input and the second input originates from the one or more computing devices.*

*28. The computer system of claim 23, wherein at least one of the first input and the second input originates from one or more computing devices.*

* * * * *